United States Patent [19]

Saunders et al.

[11] Patent Number: 5,794,572
[45] Date of Patent: Aug. 18, 1998

[54] PET BOW TIE AND METHOD OF MANUFACTURE

[76] Inventors: Leigh Saunders, 720 Center St. South, Vienna, Va. 22180; Martha K. Saunders, 5 Grist Mill La., Hingham, Mass. 02043

[21] Appl. No.: 831,595

[22] Filed: Apr. 10, 1997

[51] Int. Cl.⁶ .................................................. A01K 27/00
[52] U.S. Cl. ........................................................ 119/858
[58] Field of Search ................................... 119/850, 856, 119/858; 2/151, 154

[56] References Cited

U.S. PATENT DOCUMENTS

| | | |
|---|---|---|
| D. 131,052 | 1/1942 | Oppenhaim . |
| D. 206,525 | 12/1966 | Klimkiewicz et al. . |
| D. 206,526 | 12/1966 | Klimkiewicz et al. . |
| D. 206,749 | 1/1967 | Klimkiewicz et al. . |
| D. 206,861 | 2/1967 | Klimkiewicz et al. . |
| D. 297,776 | 9/1988 | Bridges . |
| D. 317,217 | 5/1991 | Beutler . |
| D. 337,133 | 7/1993 | Olsen et al. . |
| 623,378 | 4/1899 | McKee ................ 2/151 |
| 3,115,640 | 12/1963 | Wiest .................. 2/151 |
| 3,765,376 | 10/1973 | Higgins . |
| 4,266,511 | 5/1981 | Muench . |
| 4,407,233 | 10/1983 | Bozzacco . |
| 5,363,809 | 11/1994 | Roe .............. 119/858 X |
| 5,367,987 | 11/1994 | Lin . |
| 5,467,743 | 11/1995 | Doose . |

FOREIGN PATENT DOCUMENTS 2703214  10/1994  France ..................... 119/856

*Primary Examiner*—Thomas Price
*Attorney, Agent, or Firm*—Wigman, Cohen, Leitner & Myers, P.C.

[57] ABSTRACT

A pet bow tie comprises a substantially tubular piece of material in combination with a bow portion attached to the tubular piece of material. The bow portion has two puffed portions and two tails, each tail being joined to a respective one of the puffed portions. The bow portion also includes a band encircling the puffed portions and the tails. The method of manufacturing the pet bow tie involves folding a piece of material along an imaginary center line passing transversely through a center portion of the piece of material so as to form two tail portions interconnected by adjacent sections of the center portion. The two tail portions are stitched together along a stitch line running parallel to the center line and separating each of the tail portions from a respective one of the adjacent sections of the center portion, and the tail portions and adjacent sections of the center portion are then spread apart to form the pet bow tie. Preferably, the pet bow tie is connected to a tubular piece of material which can be mounted on the pet's collar.

23 Claims, 2 Drawing Sheets

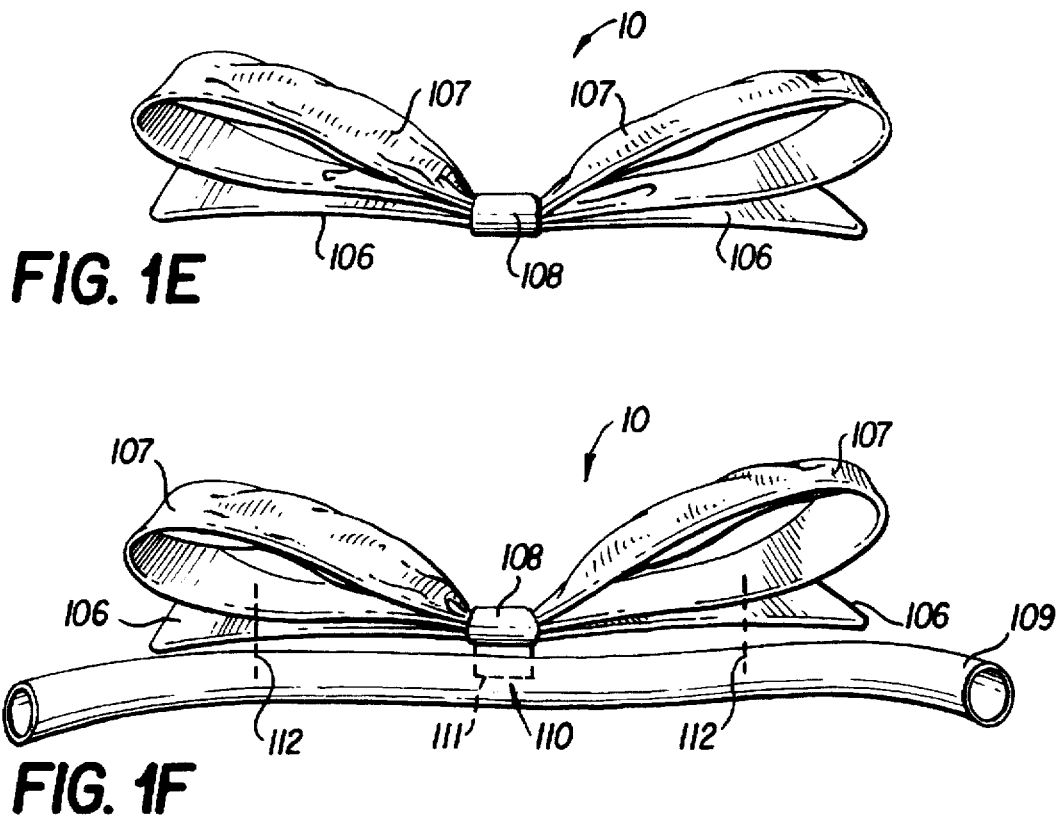
FIG. 1E
FIG. 1F
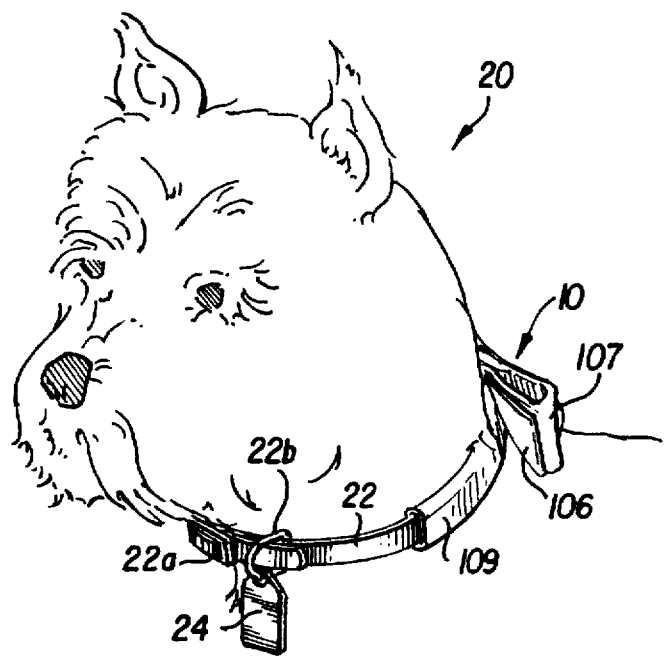
FIG. 2

PET BOW TIE AND METHOD OF MANUFACTURE

TECHNICAL FIELD

The present invention generally relates to a pet bow tie and method of manufacturing same.

BACKGROUND ART

In general, bow ties have been made and worn for many years. Throughout the years, there has been a tendency to adapt some articles of clothing for wearing by pets. Thus, there has been some minor attempt to adapt bow ties for wearing by pets, such as dogs and cats.

Nevertheless, such attempts have been burdened by, or have not addressed, the special requirements attendant to the development of pet bow ties. In particular, some pets are likely to be very rough and/or playful, and as a result bow ties can be pulled and dislodged during the pet's activities. This can happen when the pet is playing, swimming, etc. In addition, machine washing can be destructive or at least harmful to such bow ties. As a result, such bow ties are quickly harmed to the point where they are not able to be worn by the pet, or are not very attractive when worn by the pet.

In addition, there is the problem of adapting the bow tie for wear by the pet. Specifically, there is a need for the development of a pet bow tie which is easily attachable to some other item worn by the pet, such as the pet's collar. Attachment of the pet bow tie must be of such a nature as to be not easily dislodged when the pet is engaged in playing or other activities.

The following patents are considered to be relevant to the invention disclosed herein: U.S. Pat. Nos. 3,765,376; 4,266,511; 4,407,233; 5,367,987; 5,467,743; Des. 131,052; Des. 206,525; Des. 206,526; Des. 206,749; Des. 206,861; Des. 297,776; Des. 317,217; and Des. 337,133.

None of the above-identified patents addresses the problems encountered by pet bow ties of the prior art. Thus, there is a need in the prior art for the development of a pet bow tie which is durable, attractive, easily attachable to the pet or to some device worn by the pet, and not easily dislodged or damaged during the pet's activity.

DISCLOSURE OF THE INVENTION

The present invention generally relates to a pet bow tie and method of manufacturing same.

Specifically, the pet bow tie of the present invention comprises a substantially tubular piece of material in combination with a bow portion attached to the tubular piece of material. The bow portion has two puffed portions and two tails, each tail being joined to a respective one of the puffed portions. The bow portion also includes a band encircling the puffed portions and the tails.

The method of manufacturing a pet bow tie according to the invention involves folding a piece of generally rectangular or sculpted material along an imaginary center line passing transversely through a center portion of the piece of material so as to form two tail portions interconnected by adjacent sections of the center portion. The two tail portions are stitched together along a stitch line running parallel to the center line and separating each of the tail portions from a respective one of the adjacent sections of the center portion, and the tail portions and adjacent sections of the center portion are then spread apart to form the pet bow tie.

Preferably, the initial piece of material comprises two pieces of rectangular or sculpted material connected together with an interior space therebetween, and stuffing material is inserted into a center portion of the interior space prior to folding of the piece of material along the imaginary center line. This stuffing material creates the puffed-like quality of the puffed portions of the bow portion once the pet bow tie is fully assembled.

In a preferred embodiment, the pet bow tie is connected to a center portion of an elongate, tubular piece of material, and the tubular piece of material is slid onto a conventional pet collar so that, when the pet wears the collar, the bow tie is also worn on either the front or rear of the pet's neck.

Therefore, it is a primary object of the present invention to provide a pet bow tie and a method of manufacturing same.

It is an additional object of the present invention to provide a pet bow tie and method of manufacturing same, wherein the pet bow tie comprises a substantially tubular piece of material to which a bow portion is attached.

It is an additional object of the present invention to provide a pet bow tie having a bow portion which comprises two puffed portions joined together at a stitch line and two tails, each tail being joined to a respective one of the two puffed portions.

It is an additional object of the present invention to provide a pet bow tie and method of manufacturing same, wherein a band encircles the two puffed portions and the two tails of the bow portion.

It is an additional object of the present invention to provide a pet bow tie and method of manufacturing same, wherein a band encircles two puffed portions and two tails of the bow portion, and connects the bow portion to a substantially tubular piece of material at a center portion thereof.

The above and other objects, and the nature of the invention, will be more clearly understood by reference to the following detailed description, the associated drawings, and the appended claims.

BRIEF DESCRIPTION OF THE DRAWINGS

FIG. 1E is a side view of the bow-like arrangement of FIG. 1D after a band is connected to a center portion thereof.

FIG. 1F is a side view of the pet bow tie of FIG. 1E connected or stitched to a substantially tubular piece of material.

FIG. 2 is a view of a pet wearing the pet bow tie of the present invention.

BEST MODE FOR CARRYING OUT THE INVENTION

The invention will now be described in more detail with reference to the various figures of the drawings.

Figure 1A:
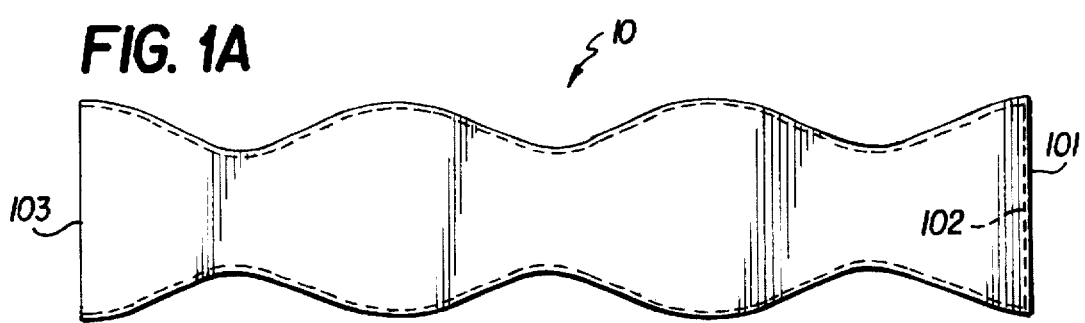
FIG. 1A is a plan view of two generally rectangular or sculpted pieces of material stitched together for use in forming the pet bow tie of the present invention.

FIG. 1A is a plan view of two substantially rectangular or sculpted pieces of material stitched together for use in forming the pet bow tie of the present invention. As seen therein, two pieces of material 101 (only one of which can be seen in the figure) are placed one on top of the other, and are stitched together along stitch line 102. One of the sides of the materials 101 is not stitched so as to form an open end 103. Once the materials 101 are stitched together, they are turned inside out.

Figure 1B:
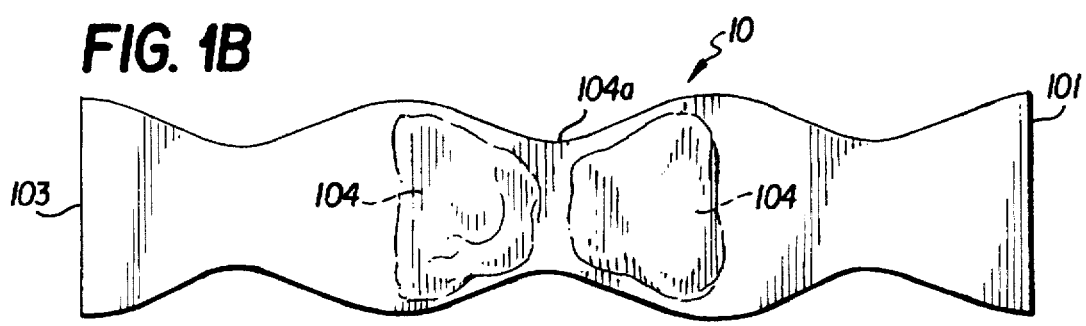
FIG. 1B is a plan view of the material of FIG. 1A, turned inside out and stuffed with stuffing material.

FIG. 1B is a plan view of the material of FIG. 1A, turned inside out and stuffed with stuffing material. In accordance with the invention, stuffing material 104 is inserted through the open end 103 of the materials 101 and is positioned in a center portion 104a thereof. Open end 103 is then sewn closed.

Figure 1C:
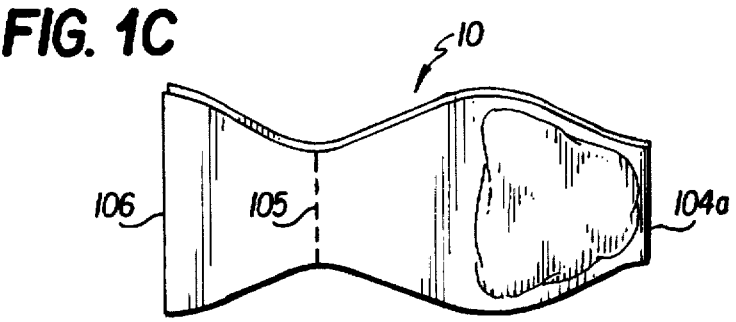
FIG. 1C is a plan view of the material of FIG. 1B after it is folded at a center portion thereof and stitched along a stitch line displaced from the center portion.

FIG. 1C is a plan view of the material of FIG. 1B after it is folded at a center portion thereof and stitched along a stitch line displaced from the center portion. In further accordance with the present invention, joined materials 101 are folded together along an imaginary line passing through center portion 104a. That is to say, materials 101 are folded in half lengthwise. Then, the two folded portions of the materials 101 are stitched together along stitch line 105.

Preferably, stitch line 105 is located two-thirds of the away from the imaginary line passing through center portion 104a. Furthermore, stitch line 105 divides the materials 101 into two portions: tails 106 to the left of stitch line 105, and puffed portions 107 to the right of stitch line 105.

Figure 1D:
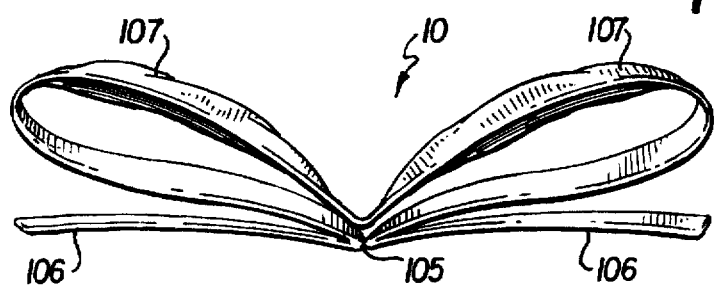
FIG. 1D is a side view of the material of FIG. 1C with adjacent sections and tail sections thereof spread apart so as to form a bow-like arrangement.

FIG. 1D is a side view of the material of FIG. 1C with adjacent sections and tail sections thereof spread apart so as to form a bow-like arrangement. In accordance with the present invention, the pet bow tie 10 is further formed by spreading apart tails 106 so that they lie horizontally flat, as seen in FIG. 1D, and puffed portions 107 are also spread apart so as to form respective half portions of a bow-like arrangement.

FIG. 1E is a side view of the bow-like arrangement of FIG. 1D after a band is connected to a center portion thereof. In further accordance with the present invention, preferably, a band 108 of appropriate material is disposed around a center portion of the bow-like arrangement, that is, around the stitch line 105 between the tails 106 and between the corresponding puffed portions 107. The band 108 can be secured in any appropriate manner to the pet bow tie 10 of FIG. 1E. For example, the band 108 can be stitched to the pet bow tie 10.

FIG. 1F is a side view of the pet bow tie of FIG. 1E connected or stitched to a substantially tubular piece of material. In further accordance with the present invention, a substantially tubular piece of material 109 is provided, and the pet bow tie 10 is secured to a center top portion 110 of tubular material 109 via stitching 111. Preferably, pet bow tie 10 is further secured to tubular material 109 by tacking the tails 106 and/or puffed portions 107 to the top side of the tubular material 109. This tacking ensures that the pet bow tie 10 will remain neatly in position despite of vigorous activity on the part of the pet.

In accordance with the invention, the tubular material 109 is, preferably, formed by the following technique. A generally rectangular piece of material is provided, and longitudinally disposed ends thereof are twice folded under and are stitched to adjacent portions at each longitudinal end of the rectangular material. The resulting arrangement is then folded lengthwise, and is sewn along a seam running lengthwise along the material, so as to form the tubular material 109 of FIG. 1F. As a final step, the tubular material 109 is turned inside out prior to connection to the pet bow tie 10.

FIG. 2 is a view of a pet wearing the pet bow tie of the present invention. As seen therein, the pet 20 is wearing a conventional collar 22. Prior to placement of the collar 22 around the neck of the pet 20, the pet bow tie 10 is mounted on the collar 22 by unbuckling the collar 22, and feeding a free end 22a of the collar 22 through the interior of the tubular material 109 of the pet bow tie 10. Once the tubular material 109 is completely situated on a center portion of the collar 22, the collar 22 is placed around the neck of the pet 20 as shown in FIG. 2, and is secured by buckling the collar 22 in a conventional manner.

Preferably, the collar 22 is positioned around the neck of the pet 20 such that the pet bow tie 10 is worn on the back of the neck of the pet 20, as seen in FIG. 2. However, alternatively, the collar 22 can be rotated around the neck of the pet 20 so that the pet bow tie 10 is worn in the front of the neck of the pet 20.

Finally, a conventional collar 22 typically has a ring 22b mounted thereon for two purposes: first, to serve as a means for securing the free end 22a of the collar 22 once it is buckled; second, to serve as a means for holding a dog license or tag 24. It should be noted that, when the ring 22b is used for the latter purpose, the weight of the tag 24 exerts a downward force on the collar 22, and that force combines with other features of the invention to cause the pet bow tie 10 to be raised into and/or secured in a prominent position at the back of the neck of the pet 20.

While preferred forms and arrangements have been shown in illustrating the invention, it is to be understood that various changes and modifications may be made without departing from the spirit and scope of this disclosure. In particular, it should be noted that, whereas specific shapes of material (e.g., rectangular, sculpted, etc.) have been shown in illustrating the invention, it should be noted that any suitable shape can be used without departing from the scope of the invention.

We claim:

1. A pet bow tie, comprising:

a substantially tubular piece of material, and a bow portion attached to said substantially tubular piece of material;

wherein said substantially tubular piece of material has a hollow interior for receiving a pet collar inserted into said hollow interior, whereby said pet bow tie is mountable onto said pet collar, and wherein said bow portion comprises two puffed portions joined together at a stitch line and two tails, each of said two tails joined to a respective one of said two puffed portions at said stitch line.

2. The pet bow tie of claim 1, wherein said bow portion further comprises a band encircling said two puffed portions and said two tails in the vicinity of said stitch line, said band connecting said portion to said substantially tubular piece of material at a center portion of said substantially tubular piece of material.

3. The pet bow tie of claim 1, wherein said two puffed portions are hollow and said bow portion includes stuffing contained in said two puffed portions.

4. The pet bow tie of claim 1, further comprising tack means, one for each of said two puffed portions, for connecting said two puffed portions to respective portions of said substantially tubular piece of material.

5. The pet bow tie of claim 4, wherein said tack means also connects said two tails to said respective portions of said substantially tubular piece of material.

6. The pet bow tie of claim 1, further comprising tack means, one for each of said two tails, for connecting said two tails to respective portions of said substantially tubular piece of material.

7. A method of manufacturing a pet bow tie, comprising the steps of:
   (a) providing a piece of material which is substantially elongate and has a center portion;
   (b) folding said piece of material along an imaginary center line passing transversely through a midpoint of said center portion so as to form two tails interconnected by adjacent sections of said center portion;
   (c) stitching said two tails together along a stitch line running parallel to said center line and separating each of said two tails from a respective one of said adjacent sections of said center portion; and
   (d) spreading said two tails apart and spreading said adjacent sections apart to form said pet bow tie.

8. The method of claim 7, further comprising the steps of providing a substantially tubular piece of material, and connecting said pet bow tie, in the vicinity of said stitch line, to said substantially tubular piece of material.

9. The method of claim 8, wherein said connecting step comprises wrapping a band around said stitch line and connecting said band to said substantially tubular piece of material.

10. The method of claim 9, further comprising the step of tacking at least one of said tails and said adjacent sections of said center portion to said substantially tubular piece of material.

11. The method of claim 8, further comprising the step of tacking at least one of said tails and said adjacent sections of said center portion to said substantially tubular piece of material.

12. The method of claim 8, wherein the step of providing said substantially tubular piece of material comprises providing a substantially rectangular piece of material, folding said substantially rectangular piece of material lengthwise, and sewing a seam lengthwise to form said substantially tubular piece of material.

13. The method of claim 12, further comprising the step, prior to the folding step, of turning respective ends of said substantially rectangular piece of material under, and stitching said respective ends of said substantially rectangular piece of material to adjacent respective portions of said substantially rectangular piece of material.

14. A method of manufacturing a pet bow tie, comprising the steps of:
   (a) providing two pieces of material connected together with an interior space therebetween;
   (b) inserting stuffing material into a center portion of said interior space;
   (c) folding said two pieces of material along an imaginary center line passing longitudinally through a midpoint of said center portion so as to form two tails remotely located with respect to said imaginary center line;
   (d) stitching said two tails together along a stitch line parallel to said imaginary center line and located on a side of said stuffing material remote from said imaginary center line; and
   (e) spreading said tails apart and spreading adjacent sections of said center portion apart to form said pet bow tie.

15. The method of claim 14, further comprising the steps of providing a substantially tubular piece of material, and connecting said pet bow tie, in the vicinity of said stitch line, to said substantially tubular piece of material.

16. The method of claim 15, wherein said connecting step comprises wrapping a band around said stitch line and connecting said band to said substantially tubular piece of material.

17. The method of claim 16, further comprising the step of tacking at least one of said tails and said adjacent sections of said center portion to said substantially tubular piece of material.

18. The method of claim 15, further comprising the step of tacking at least one of said tails and said adjacent sections of said center portion to said substantially tubular piece of material.

19. The method of claim 15, wherein the step of providing said substantially tubular piece of material comprises providing a substantially rectangular piece of material, folding said substantially rectangular piece of material lengthwise, and sewing a seam lengthwise to form said substantially tubular piece of material.

20. The method of claim 19, further comprising the step, prior to the folding step, of turning respective ends of said substantially rectangular piece of material under, and stitching said respective ends of said substantially rectangular piece of material to adjacent respective portions of said substantially rectangular piece of material.

21. The method of claim 14, wherein step (a) comprises providing two pieces of substantially rectangular material, each piece of substantially rectangular material having four sides, wherein three of the four sides of one of the two pieces of substantially rectangular material are connected to a corresponding three of the four sides of another of the two pieces of substantially rectangular material.

22. A collar with a bow tie, comprising:
   a substantially tubular piece of material, and
   a bow portion attached to said substantially tubular piece of material;
   wherein said substantially tubular piece of material has a hollow interior receiving a collar inserted into said hollow interior, and wherein said tubular piece encloses a substantial portion of said collar.

23. A bow tie consisting of:
   a substantially tubular piece of material, and
   a bow portion attached to said substantially tubular piece of material.

* * * * *